Sept. 17, 1963    T. EVANS ETAL    3,103,775
CROP FEEDING MEANS FOR A BALER
Filed Oct. 27, 1960    2 Sheets-Sheet 1

INVENTORS.
JACK O. UTTERBACK
THOMAS EVANS
BY

Sept. 17, 1963

T. EVANS ETAL 3,103,775

CROP FEEDING MEANS FOR A BALER

Filed Oct. 27, 1960

INVENTORS.
JACK O. UTTERBACK
THOMAS EVANS
BY

3,103,775
CROP FEEDING MEANS FOR A BALER
Thomas Evans, Bettendorf, and Jack O. Utterback, Davenport, Iowa, assignors to J. I. Case Company, Racine, Wis., a corporation of Wisconsin
Filed Oct. 27, 1960, Ser. No. 65,465
7 Claims. (Cl. 56—341)

This invention relates to a hay baler of the type having a pick-up means, and especially to a baler having a sweep-feed device that conveys a crop from the pickup means into the baling chamber opening, and returns to the pickup for another charge of the crop.

It has been the practice with balers of this type to provide the sweep-feed device with crop-engaging means of various designs which tend to drag the previously-advanced crop away from the bale-case opening on the return stroke.

There is also a tendency for balers of this type to permit the crop to separate as it is being conveyed into the opening, a portion of it remaining on the platform to obstruct the continuous feeding of the crop from the pickup.

An object of this invention is to provide a crop sweep-feed device having means to prevent dragging the crop away from the bale-case opening when the device is returning for another charge.

Another object is to provide a crop sweep-feed device that does not permit the charge to disintegrate on the platform while being conveyed into the baling chamber.

Further objects and advantages of the invention will become apparent from a consideration of the following detailed description taken in connection with the accompanying drawings, wherein an illustrative embodiment of the invention is shown. However, it is to be understood that the invention is not limited to the details disclosed, but includes all such variations and modifications as fall within the spirit of the invention as defined in the claims.

Referring to the drawings,

FIG. 1 is a fragmentary plan view of a baler with parts removed.

Figure 4:
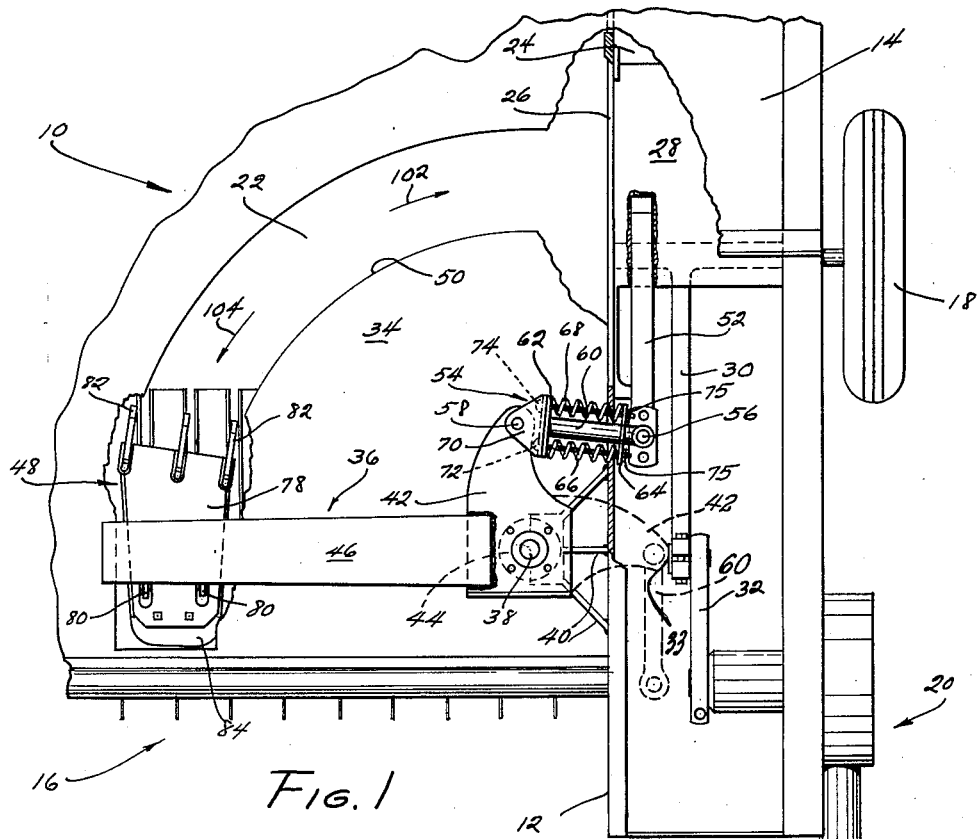
FIG. 4 is a sectional view taken at the line 4—4 of FIG. 2.
Figure 5:
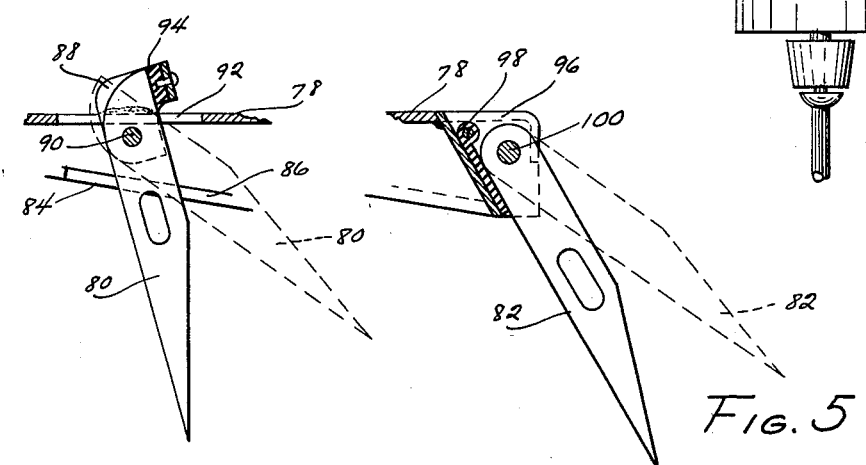
FIG. 5 is a sectional view taken at the line 5—5 of FIG. 2.
Figure 2:
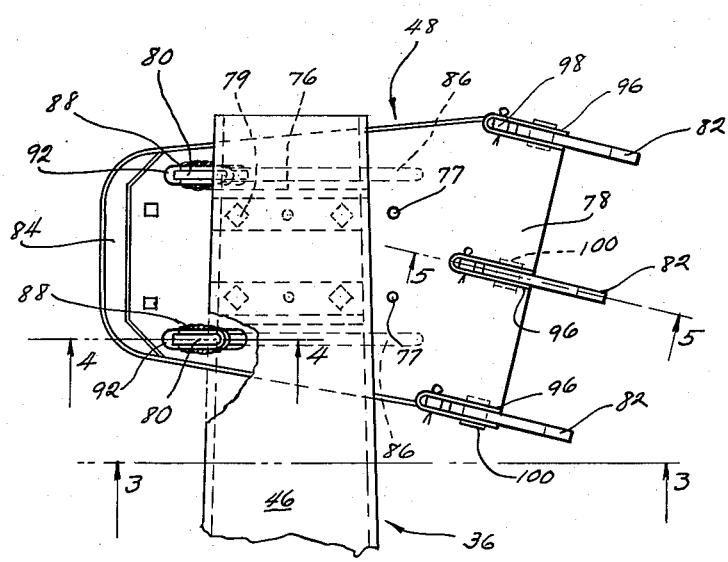
FIG. 2 is an enlarged fragmentary plan view of a portion of FIG. 1.
Figure 3:
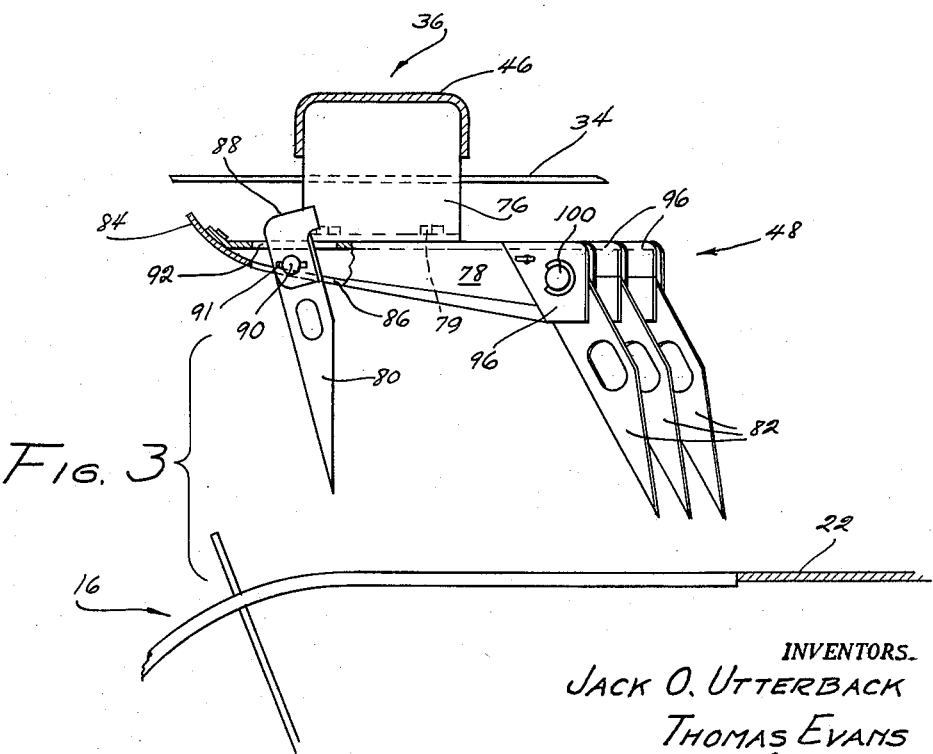
FIG. 3 is a fragmentary sectional view taken at the line 3—3 of FIG. 2 and with parts broken away.

Referring again to the drawings, a typical baler is indicated at 10 and comprises a frame 12, a bale case 14, and a forwardly-positioned pickup 16. Transport wheels such as 18, only one being shown, provide the means for transporting the baler over the ground, and a drive mechanism 20 mounted on the frame 12 provides the means to operate the baling mechanism from the usual tractor power take-off.

A horizontal feeder platform 22 extends laterally from the bale case 14 and receives the crop being gathered and conveyed by the pickup 16. Bale case 14 has a baling chamber 24 and an opening 26 in the side thereof. A baling plunger 28 is slidable in baling chamber 24 and is actuated by the usual pitman 30 which is pivoted on the plunger 28. The other end of pitman 30 is pivotally connected to a crank 32 of drive mechanism 20.

A cover sheet 34 is spaced above platform 32 and is secured to frame 12. Sheet 34 prevents the crop being baled from escaping upwardly from the feeder platform. A sweep arm assembly 36 is mounted above sheet 34 on a vertical shaft or pivot 38 and swings in an arcuate path. Shaft 38 is rigidly supported by a bracket carried by plate members 40 which are secured to frame 12. Sweep arm assembly 36 comprises a lever 42 secured to a hub 44 which rotates on pivot shaft 38. A sweep arm 46 is secured to lever 42 and carries beneath itself a sweep-feed head 48. A slot 50 is provided in sheet 34 to permit swinging of head 48 over platform 22 and below cover sheet 34.

An extension member 52 extends forwardly from plunger 28 and is secured rigidly to the upper portion of the plunger by any suitable means, such as for example by welding.

A resilient shock absorbing link 54 is connected between a pivot pin 56 on member 52, and a pivot means 58 on lever 42. Link 54 comprises a central member 60 connected to pivot 56 and which member has a plate 62 fixed to one end thereof. A plate 64, similar to plate 62, is slidable on member 60 and spaced from plate 62. A pair of compression springs 66 and 68 are placed one on each side of member 60 and between plates 62 and 64. A yoke 70 is pivoted to lever 42 at pivot 58 and abuts plate 62. A pair of carriage bolts 72 and 74 pass freely through yoke 70, plate 62, springs 66 and 68, and plate 64, and have heads that abut yoke 70. Nuts 75 are threaded on bolts 72 and 74 and against plate 64. Adjustment of nuts 75 will move plate 64 toward or away from plate 62 so as to provide adjustment for compression of springs 66 and 68. This adjustment will regulate the amount of yield of arm 46 for various densities of the crop being baled, for example, if at any time, the crop on platform 22 offers resistance to being conveyed into opening 26, yoke 70 will separate from plate 62. Plate 62 being attached to central member 60 will compress springs 66 and 68 and permit arm 36 to rest against the crop while link 54 is being extended against the compression of springs 66 and 68 and plunger is uncovering opening 26. This operation prevents possible damage caused by a sudden arrest of the sweep arm 36. Sweep head 48 is positioned below the plane of sheet 34 and is provided with a bracket 76 which extends upwardly through slot 50 and is secured to arm 46. Bracket 76 is provided with holes that align with a group of holes 77 in head 48 to secure head 48 to the bracket in various positions. Head 48 comprises a body portion 78 of the shape of an irregular polygon, as shown, having a plurality of groups of depending fingers spaced apart in the direction of the arcuate path taken by the head 48. A first group of fingers 80 is positioned at the forward end of body portion 78 and a second group of similar fingers 82 is located at the rearward end of the body portion. A shoe 84 is secured to the underside of body 78 and presents a smooth surface so that the head 48 can slide smoothly over the crop deposited on the platform 22 when the arm 36 is returning toward pickup 16 for another charge of crop. Slots 86 are provided in shoe 84 to permit fingers 80 to retract therein when head 48 is returning to engage the crop on platform 22.

Fingers 80, of which there are two, comprise the first group and depend from head 48, and are embraced by the side faces of brackets 88 which have pivot pins 90 to pivotally support the fingers. Conventional means 91, such as cotter pins, prevent displacement of pins 90. Brackets 88 are secured in slots 92 as by welding. Plastic bumpers 94 are inserted in the closed portions of brackets 88 to silence the operation of the fingers, and are held in place by pins or similar means.

Fingers 82, of which there are three, comprise the second group and are supported in brackets 96 and are staggered relative to fingers 80. Brackets 96 are fitted into cutout portions of body 78 and are welded in place.

Brackets 96 are of a shape so as to embrace the side faces of fingers 82. Fingers 82 are pivoted on pins 100 which pass through the sides of brackets 96. The closed portions of brackets 96 have plastic bumpers 98 to prevent contact between fingers 82 and the brackets in order to minimize noise. Fingers 80 and 82 are pointed at their lower ends to assure quick penetration of the crop and to assure positive conveying of the latter into bale chamber 24. The operation of this baler will now be summarized.

The baler is transported by a tractor over a field containing a crop which has been previously cut and windrowed. The crop is elevated from the ground by the pickup 16 to the platform 22 at a constant rate. Sweephead arm 36 swings from a position adjacent pickup 16 to a position near opening 26. As arm 36 advances toward opening 26, the points of fingers 80 and 82 positively engage the crop that has accumulated on platform 22 and sweep the crop toward and into the opening 26; plunger 28 having shifted to a position to clear the opening and permit entrance of the crop.

Spacing apart of the groups of fingers 80 and 82 in the direction of the path of travel of head 48 and staggering one group relative to the other, distributes the effectiveness of the crop-engaging points and holds the charge of crop together against separating.

Inasmuch as arm 36 is operated directly from the plunger, the return of the latter to compress the crop in the bale chamber 24 swings arm 36 away from the opening and toward the pickup to repeat the operation. In the meantime, pickup 16 has conveyed an additional charge of the crop to platform 22 and fingers 80 and 82 in returning to the pickup must traverse this crop without dragging it toward the pickup 16. During this return cycle, shoe 84 rides smoothly over the crop and fingers 80 and 82 retract upwardly, fingers 80 entering slots 86, and fingers 82 swinging upwardly within brackets 96.

In the event that an excess amount of crop is being conveyed toward opening 26 by arm 36 and cannot enter the opening, so that movement of the arm is arrested, plunger 28 will continue to move, compressing springs 66 and 68, thereby cushioning the shock that would otherwise be transmitted to the drive mechanism.

The above being a complete description of an illustrative embodiment of the invention, what is claimed as new and desired to be secured by Letters Patent of the United States is:

1. In a baler of the type having a frame, a baling chamber on said frame having an opening in the side thereof, a plunger slidable in the chamber, and a crop pickup means; the combination including a horizontal platform adjacent said opening, a sweep-feed arm extending over said platform, a vertical pivot for said arm on said frame supporting the same for swinging in an arcuate path, a lever arm on said sweep-feed arm, a rigid connecting member fixed on and extending from said plunger, a link connecting said lever arm and said connecting member whereby sliding of said plunger will swing said sweep arm between said pickup means and said opening, a sweep head on said sweep-feed arm comprising a body mounted on said arm, a plurality of depending fingers on said body spaced in the direction of said path, each of said fingers having a pivot means to swing freely when said sweep arm is swung toward said pickup means, and stop means in said sweep head to arrest the swinging of said fingers when said sweep arm is swung toward said opening and is conveying a crop into said opening.

2. In a baler having a frame, a bale chamber, a sliding plunger in the bale chamber, and a plunger operating means; in combination a sweep arm having a vertical pivot on said frame, a rigid extension member fixedly secured to said plunger and extending toward said operating means, and a link pivotally connected between said extension member and a point on said arm spaced from said vertical pivot to swing said arm in synchronism with the movement of said plunger.

3. In a baler having a frame, a bale chamber having an opening, a plunger slidable in said chamber to alternately clear and obstruct said opening and a drive mechanism to slide said plunger; in combination, a crop sweep-feed arm pivoted on said frame for swinging horizontally in an arcuate path to sweep a crop into said opening, a lever on said arm, a forwardly-extending rigid extension member fixedly secured to said plunger, and a link pivotally connecting said lever with said extension member for swinging said arm toward said opening to deposit said crop into said opening when said plunger clears said opening.

4. In a baler, a sweep arm pivoted on a vertical axis thereon for moving a crop in an arcuate path, and having a sweep-feed head, said head comprising a body, depending fingers pivoted on said body at positions spaced apart in the direction of said path, pivot means individual to each of said fingers, said fingers being free to pivot upwardly upon engaging a crop when said head is moving in one direction, and means individual to said fingers to arrest pivoting of said fingers in a crop engaging position when said head is moving in the other direction and conveying said crop.

5. In a baler, a sweep-feed arm pivoted to move in a horizontal path and having a feed head attached thereto, said head comprising a body portion, a first group of fingers and a second group of fingers depending from said head, said fingers having crop-engaging points, said groups being spaced apart in the direction of said path, the fingers of each group being spaced apart in a direction transverse to said path and staggered with respect to the fingers of the other group, a shoe positioned below said body and substantially coextensive therewith, a bracket embracing the sides of each of said fingers and secured to said body, pivot means in said brackets for said fingers, said pivot means being positioned intermediate said body and said shoe, said brackets having means to limit the swing of said fingers when said head is swung in one direction and said fingers being free to swing upwardly when said head is swung in the other direction, said shoe providing slots to receive the fingers of said first group when said head is swung in said other direction, whereby said fingers of said first group are at least partially enclosed in said shoe when said head is swung in said other direction.

6. In a baler, a sweep-feed arm pivoted to move in a horizontal path and having a feed head attached thereto, said head comprising a body portion, a first group of fingers and a second group of fingers depending from said head, said fingers having crop-engaging points, said groups being spaced apart in the direction of said path, the fingers of each group being spaced apart in a direction transverse to said path, a shoe positioned below said body and substantially coextensive therewith, a bracket embracing the sides of each of said fingers and secured to said body, pivot means in said brackets for said fingers, said brackets having means to limit the swing of said fingers when said head is swung in one direction and said fingers being free to swing upwardly into said shoe when said head is swung in the other direction.

7. In a feeder for a baler of the type having a frame comprising essentially walls enclosing a bale case, a crop compressing plunger reciprocable in the case, means for reciprocating the plunger, and one of the walls providing an opening traversed by the plunger in the course of reciprocations thereof so that the plunger will extend across and close the opening in one position and will clear the opening in another position thereof; the combination of means for conveying crop material to and through said opening including a platform leading to said opening, a sweep arm, an upwardly directed pivot fixed in relation to said frame, about which said arm is swingable in a path spaced above and generally parallel to said platform, a feeder head fixed on said sweep arm spaced from said pivot and of a size suitable to enter said opening at times when said plunger is clear of said opening, said pivot being so located that said arm will swing on an axis adjacent the wall of said baling chamber provided with said opening, and spaced from said opening sufficiently that said feeder head will pass into and out of said opening in said bale case by reason of oscillation of said sweep arm about said pivot, a lever fixed in relation to said sweep arm and extending in relation to said bale case substantially normal to the direction of movement of said plunger when said feeder head is in said opening, and a link connected to said lever and extending generally parallel to the direction of movement of said plunger when said feeder head is in said opening, and connected with said plunger for oscillating said feeder head in synchronism with the reciprocations of said plunger, said link being sufficiently short in relation to the plunger stroke that said lever arm will position it substantially normal to the direction of movement of said plunger when the latter is at the end of its stroke closing said opening.

References Cited in the file of this patent
UNITED STATES PATENTS

| | | |
|---|---|---|
| 2,487,938 | Nikkel | Nov. 15, 1949 |
| 2,720,073 | Freeman et al. | Oct. 11, 1955 |
| 2,765,902 | Myers | Oct. 9, 1956 |